United States Patent [19]

Williams

[11] Patent Number: 4,821,401
[45] Date of Patent: Apr. 18, 1989

[54] QUICK CHANGE COLLET AND REMOVAL TOOL

[75] Inventor: Brian D. Williams, Bettendorf, Iowa

[73] Assignee: Deere & Company, Moline, Ill.

[21] Appl. No.: 198,413

[22] Filed: May 25, 1988

Related U.S. Application Data

[62] Division of Ser. No. 33,447, Apr. 1, 1987, Pat. No. 4,768,269.

[51] Int. Cl.$^4$ ............... B23P 19/04; B25B 13/48; B23Q 3/15
[52] U.S. Cl. ................................. 29/568; 29/225; 29/243; 279/1 ME; 279/46 R
[58] Field of Search ............... 279/1 R, 1 K, 1 ME, 279/46–59; 29/225, 235, 243, 568

[56] References Cited

U.S. PATENT DOCUMENTS 2,277,816  3/1942  Brown ........................ 279/46 R
4,214,766  7/1980  Rall et al. .................... 279/46 R Primary Examiner—Gil Weidenfeld
Assistant Examiner—Steven C. Bishop

[57] ABSTRACT

A workpiece holding collet is provided with at least one tool receiving aperture located in each collet segment. A changing tool having mating fingers is inserted into the collet, when it is in its compressed condition in a chuck. The chuck is then opened, releasing the collet, so that the interior sidewalls of the apertures frictionally engage the tool fingers inserted therein, thereby locking the collet to the changing tool. The tool is provided with a handle so that an operator may now remove the collet and then store the collet together with the tool.

5 Claims, 2 Drawing Sheets

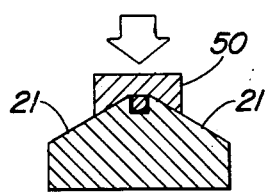
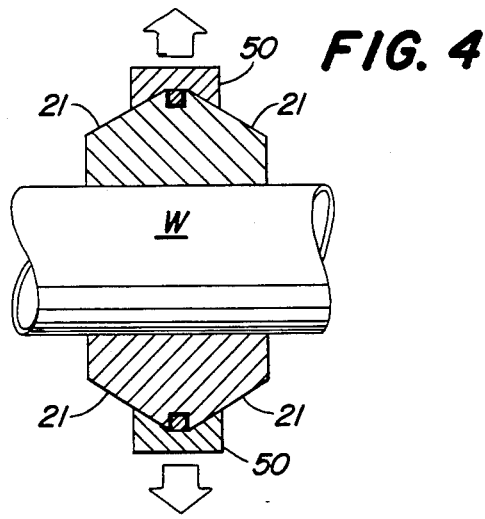
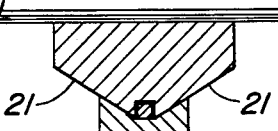
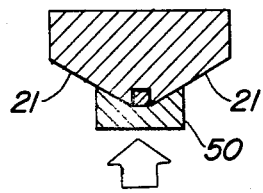
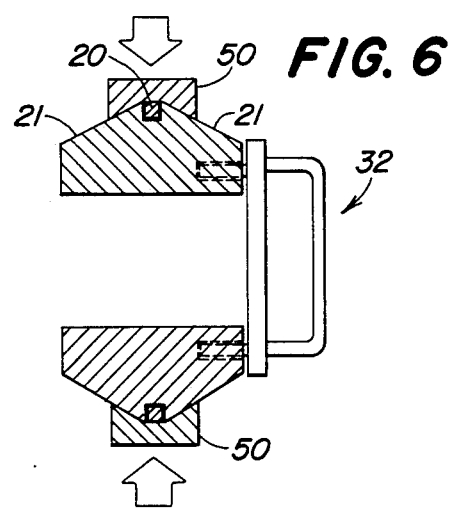
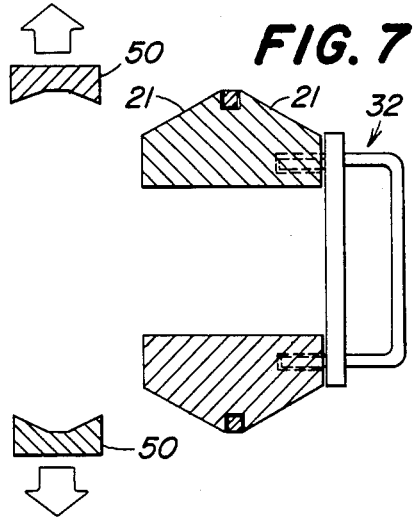
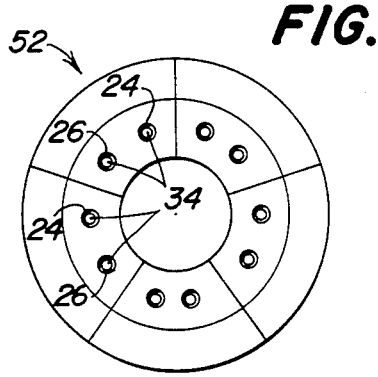
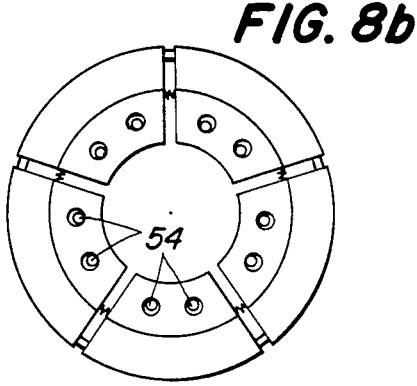

QUICK CHANGE COLLET AND REMOVAL TOOL

This application is a division of application Ser. No. 033,447, filed Apr. 1, 1987, now U.S. Pat. No. 4,768,269.

BACKGROUND OF THE INVENTION

1. Field of the Invention

The invention is directed to a quick change collet which is used to hold a workpiece in a machine, and a specialized collet removing tool for removing the quick change collet from the machine.

2. Description of the Prior Art

In lathe-type machines, a workpiece is inserted into a collet which engages the workpiece and holds it tightly in the machine as a chuck compresses the collet against the workpiece. A typical collet is provided with a plurality of segments defining a work engaging opening. The segments are joined together by springs which tend to bias the segments outwardly away from the work engaging opening. A ring located about the periphery of the collet maintains the overall collet configuration. Collets have exterior chuck engaging surfaces that engage the interior compression surfaces of the chuck.

Whenever a different sized workpiece must be machined, the collet must be changed to accommodate the new structural dimension. This may be a relatively common occurrence in some situations because the collets may only have a 0.25 inch throw. In some machines, it may be very difficult to remove the collet from the machine because the compressing chuck must be partially disassembled to release the collet. In addition, it sometimes is difficult to handle the collet because of its smooth surface and lack of handles.

SUMMARY OF THE INVENTION

The present invention provides a collet that can be quickly and easily removed from a chuck by a cooperating tool. The collet is relatively typical except that tool receiving apertures are formed in the face of each segment of the collet. The tool is provided with outwardly extending fingers for engaging the apertures and gripping the collet. The collet is gripped by the tool when it is in a compressed condition, so that as it is released by the chuck, the springs of the collet force the collet segments outwardly forcing the sidewalls of the apertures against the fingers and frictionally locking the collet to the tool.

BRIEF DESCRIPTION OF THE DRAWINGS

FIGS. 4–7 illustrate the method of removing the collet using the collet removing tool.

FIGS. 8a and 8b illustrate the frictional locking of the collet to the tool.

DETAILED DESCRIPTION

Figure 1:
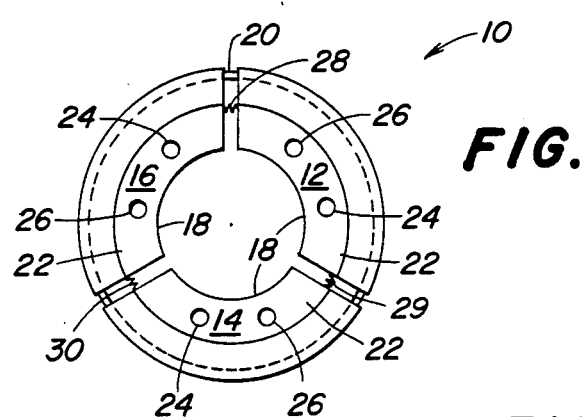
FIG. 1 is a front view of a three segment collet having the quick change feature.

FIG. 1 illustrates a circular collet 10 having three segments, 12, 14 and 16, which define a cylindrical work engaging surface 18. Ring 20 is used to define the outer circumferential limit of the collet. Exterior surface 21 of collet is beveled to accommodate the compressing jaws of a chuck. Each of the three segments has a flat surface 22 that are coplanar with one another. Two apertures 24 and 26 are formed in each of these surfaces and form tool receiving apertures. In addition, each segment is resiliently coupled to one another by springs 28, 29 and 30.

Figure 2:
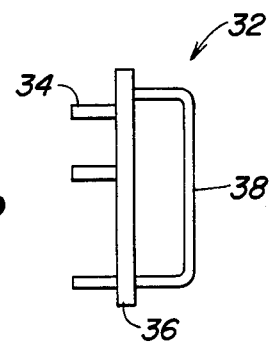
FIG. 2 is a side view of a quick change tool for collets of the present invention.

FIG. 2 illustrates a quick change collet removal tool 32 having a plurality of fingers 34 extending from flat circular plate 36. The location and number of fingers corresponds to the number of apertures in the collet. For example, a three segment collet has six apertures, therefore, a tool for this collet would have six fingers, whereas a collet having five segments would have ten apertures and the corresponding removal tool ten fingers. On the opposite side of the plate from the fingers is a handle assembly 38.

Figure 3:
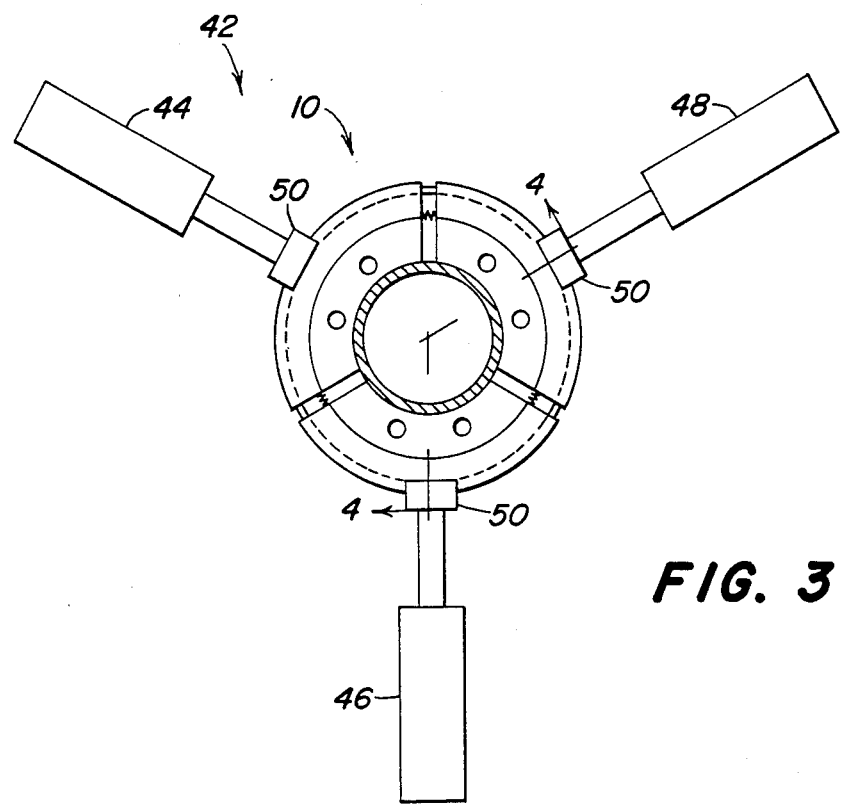
FIG. 3 is a schematic view of a hydraulic chuck gripping a three segment collet.

FIG. 3 illustrates a simplified hydraulic chuck 42 having three hydraulic cylinders 44, 46 and 48 that engage three segment collet 10 by collet engaging assemblies 50. Assemblies 50 having a V-shaped groove that mates with the exterior beveled surface of the collet. Each of the hydraulic cylinders is identical and is hydraulically coupled to a single source of hydraulic pressure so that an equal force is exerted on each of the collet segments. Workpiece W, such as a cylindrical rod, is placed in the collet and the hydraulic chuck is actuated to compress the collet thereby gripping the workpiece. The workpiece is released by reversing the hydraulic cylinders. It should be noted that different types of chuck assemblies can be used for gripping and closing the collet, and that the present quick change collet is not limited to hydraulic chucks.

To remove the collet, the chuck is opened releasing the workpiece (FIG. 4). The now empty collet is then compressed by the chuck (FIG. 5). The outwardly extending fingers 32 of changing tool 32 are then inserted into the tool receiving apertures of the collet (FIG. 6). The chuck is then reversed (FIG. 7) releasing the collet. The collet remains in its compressed state because of the limiting nature of the fingers. The sidewalls of the apertures expand against the fingers frictionally locking the collet to the changing tool. The operator then grips handle 38 of the changing tool and removes the collet through the now open jaws of the chuck. The collet can now be stored together with the handle for more efficient handling by the operator.

FIGS. 8a and 8b illustrate the frictional locking of five-segment collet 52 in a ten fingered changing tool. More specifically, FIG. 8a illustrates inserting tool fingers 34 into apertures 24 and 26 when the collet is compressed to the chuck. FIG. 8b illustrates the released and expanded chuck being restrained by the fingers 34. The sidewalls of the apertures are forced against fingers 34 at 54 frictionally locking the collet to the tool.

To insert a new collet, the operator grabs the handle of the tool holding the desired collet and inserts the collet into the chuck through its open jaws. The operator then actuates the chuck to compress the collect so that the changing tool can be released. It should b noted that the tool receiving apertures should be slightly bigger than the engaging fingers so that the fingers may be easily inserted into and removed from the collet when it is fully compressed. In addition, the fingers do not have to be circular, but may be square and engage radially arranged rectangular apertures in the collet. With such a configuration, the long side of the rectangular apertures would be radially arranged so that the square finger would slip along the rectangular slot as the collet expands.

The subject invention should not be limited by the above described embodiments, but should be limited solely by the claims that follow.

I claim:

1. A method of rapidly changing a work holding collet in a machine wherein the collet is provided with a plurality of segments defining a work engaging surface, the segments are resiliently held together by a resilient means, each segment is provided with at least one aperture for receiving an outwardly extending finger of a collet removal tool, the method comprising the following sequential steps:
    first, compressing the collet held in the machine by the machine compressing the collet;
    second, inserting the fingers of a collet removal tool into the tool receiving apertures in the collet;
    third, removing the collet with the tool from the machine.

2. A method as defined by claim 1 comprising the additional step of releasing the compressing force on the collet after the fingers of the tool have been inserted into the apertures so that the sidewalls of the apertures in the expanding collet press against the fingers frictionally locking the collet to the tool.

3. A method as defined by claim 2 comprising the additional step of storing the collet and tool together after they have been removed from the machine.

4. A method of rapidly changing a work holding collet in a machine wherein the collet is provided with a plurality of segments defining a work engaging surface, the segments are resiliently held together by a resilient means, each segment is provided with at least one aperture for receiving an outwardly extending finger of a collet removal tool, the method comprising the following steps:
    compressing the collet held in the machine;
    inserting the fingers of a collet removal tool into the tool receiving apertures in the collet;
    releasing the compressing force on the collet after the fingers of the tool have been inserted into the apertures so that the sidewalls of the apertures in the expanding collet press against the fingers frictionally locking the collet to the tool; and
    removing the collet with the tool from the machine.

5. A method as defined by claim 4 comprising the additional step of storing the collet and tool together after they have been removed from the machine.

* * * * *